US008493357B2

(12) United States Patent
McCracken

(10) Patent No.: US 8,493,357 B2
(45) Date of Patent: Jul. 23, 2013

(54) MECHANICAL MEANS FOR PROVIDING HAPTIC FEEDBACK IN CONNECTION WITH CAPACITIVE SENSING MECHANISMS

(75) Inventor: David McCracken, Aptos, CA (US)

(73) Assignee: Integrated Device Technology, Inc, San Jose, CA (US)

( * ) Notice: Subject to any disclaimer, the term of this patent is extended or adjusted under 35 U.S.C. 154(b) by 205 days.

(21) Appl. No.: 13/041,173

(22) Filed: Mar. 4, 2011

(65) Prior Publication Data

US 2012/0223910 A1 Sep. 6, 2012

(51) Int. Cl.
*G06F 3/045* (2006.01)
(52) U.S. Cl.
USPC .......................................... 345/174; 345/179
(58) Field of Classification Search
USPC ............. 345/173, 174, 179; 178/18.01, 19.03
See application file for complete search history.

(56) References Cited

U.S. PATENT DOCUMENTS

| 7,923,654 B2* | 4/2011 | Zeijlon et al. ................. 200/600 |
| 2002/0149571 A1* | 10/2002 | Roberts .......................... 345/174 |
| 2008/0018611 A1* | 1/2008 | Serban et al. ................. 345/173 |
| 2009/0065267 A1* | 3/2009 | Sato ............................ 178/18.06 |
| 2009/0079699 A1* | 3/2009 | Sun ............................... 345/173 |
| 2009/0135142 A1* | 5/2009 | Fu et al. ......................... 345/168 |
| 2009/0143142 A1* | 6/2009 | Marcus et al. .................. 463/37 |
| 2010/0171715 A1* | 7/2010 | Peterson et al. ............. 345/173 |
| 2010/0200309 A1* | 8/2010 | Yilmaz et al. .............. 178/18.03 |
| 2010/0201650 A1* | 8/2010 | Son ............................... 345/174 |
| 2010/0250071 A1* | 9/2010 | Pala et al. ........................ 701/48 |
| 2011/0057899 A1* | 3/2011 | Sleeman et al. ............. 345/174 |
| 2011/0095877 A1* | 4/2011 | Casparian et al. ......... 340/407.2 |
| 2011/0109573 A1* | 5/2011 | Deslippe et al. .............. 345/173 |
| 2011/0193787 A1* | 8/2011 | Morishige et al. ............ 345/173 |
| 2011/0267300 A1* | 11/2011 | Serban et al. ................. 345/174 |

* cited by examiner

*Primary Examiner* — Joe H Cheng
(74) *Attorney, Agent, or Firm* — Hayes and Boone LLP

(57) ABSTRACT

Method and apparatus for providing haptic feedback in connection with a capacitive sensing mechanism are described. In one embodiment, the apparatus comprises a convex, non-metallic structure arranged so as to maintain physical separation between an activator and the capacitive sensing mechanism until sufficient force is applied by the activator. The structure does not form a part of an electrical circuit comprising the capacitive sensing mechanism.

20 Claims, 3 Drawing Sheets

MECHANICAL MEANS FOR PROVIDING HAPTIC FEEDBACK IN CONNECTION WITH CAPACITIVE SENSING MECHANISMS

TECHNICAL FIELD

The present disclosure is related to capacitive sensing mechanisms and, in particular, to mechanical means for providing haptic feedback in connection with such mechanisms.

DISCUSSION OF RELATED ART

Capacitive sensing mechanisms, such as a capacitive touchscreen, for example, enable implementation of electronic visual displays that can detect the presence and location of contact within a defined display area. Such mechanisms can sense pressure applied by passive objects, such as a finger, for example. A capacitive touch screen has two primary attributes that appeal to users. First, it enables users to interact directly, rather than indirectly using a mouse or touchpad, with what is displayed. Additionally, it allows users to do so without the use of any intermediate device, such as a stylus. Capacitive touch screen displays play an important role in the implementation of digital devices such as personal digital assistants ("PDAs") and mobile phones.

Touch buttons implemented using capacitive sensing mechanisms include no moving parts and are inexpensive and reliable, but provide no activation feedback and can be easily inadvertently activated. Some handheld devices, such as the Blackberry® device from Research in Motion, Inc., include mechanical buttons on their front face, even though such buttons consume more depth, are less reliable, and are more expensive than capacitive touch buttons. The primary rationale for using mechanical buttons, therefore, is that each button provides definitive tactile, or haptic, feedback when pressed. Capacitive touch buttons provide no such feedback.

Therefore, what is needed is an inexpensive and reliable means for providing mechanical feedback in connection with activation of capacitive touch buttons.

SUMMARY

One embodiment is an apparatus for providing haptic feedback in connection with a capacitive sensing mechanism. The apparatus comprises a convex, non-metallic structure arranged so as to maintain physical separation between an activation means and the capacitive sensing mechanism until sufficient force is applied by with the activation means. The structure does not form a part of an electrical circuit comprising the capacitive sensing mechanism.

Another embodiment is a method for providing haptic feedback in connection with a capacitive sensing mechanism disposed in an electronic device. The method comprises arranging an apparatus comprising a convex, non-metallic structure in such manner as to maintain physical separation between an activation means and the capacitive sensing mechanism until sufficient force is applied with the activation means. The structure does not form a part of an electrical circuit comprising the capacitive sensing mechanism.

Yet another embodiment is an electronic device comprising a printed circuit board ("PCB") and an input device associated with the PCB. The input device includes a capacitive sensing mechanism and a haptic feedback structure associated with the capacitive sensing mechanism. The haptic feedback structure provides a physical barrier between an activation means and the capacitive sensing mechanism for preventing a touch to be detected by the capacitive sensing mechanism until sufficient force is applied with the activation means. The structure does not form a part of an electrical circuit comprising the capacitive sensing mechanism.

These and other embodiments will be described in further detail below with respect to the following figures.

DETAILED DESCRIPTION

Figure 1:
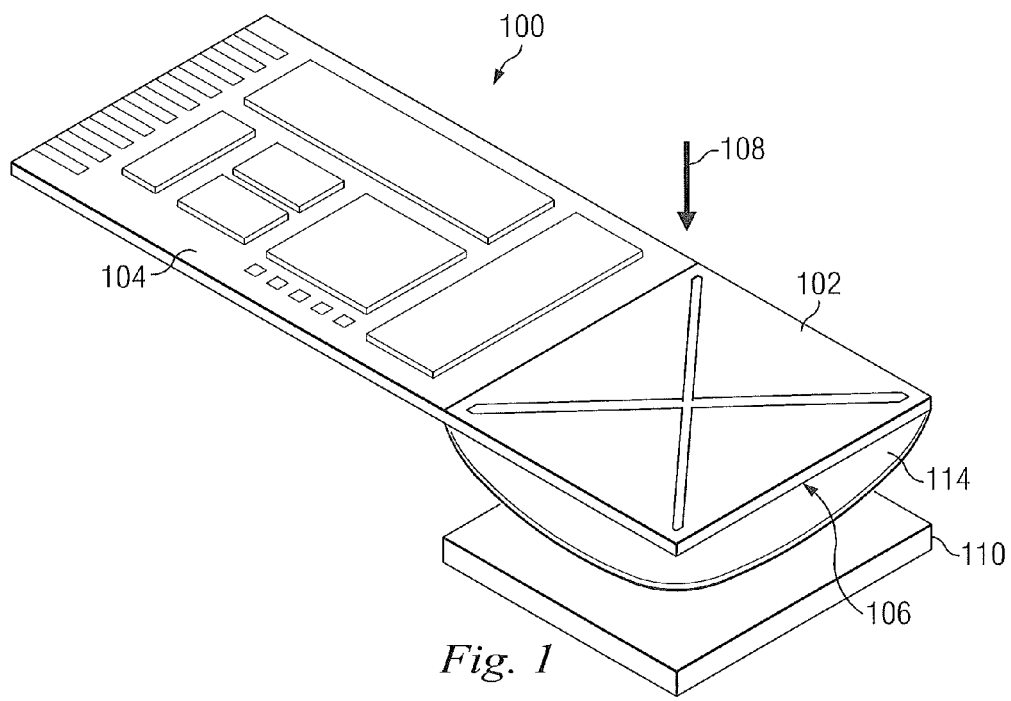
FIG. 1 is a perspective view of a mechanical means for providing haptic feedback in connection with a capacitive sensing mechanism implemented as a combination navigation and activation device in accordance with one embodiment.

In the following description specific details are set forth describing certain embodiments of the disclosure. It will be apparent, however, to one skilled in the art that the present disclosure may be practiced without some or all of these specific details. The specific embodiments presented are meant to be illustrative of the present disclosure, but not limiting. One skilled in the art may realize other material that, although not specifically described herein, is within the scope and spirit of this disclosure. In the drawings, elements having the same designation have the same or similar functions.

Some embodiments comprise a mechanical haptic feedback means deployed in connection with a capacitive sensing mechanism, such as a capacitive touch screen, for physically separating a finger or other activating means, such as a stylus, from a capacitive-sensing plate such that a "touch" is not registered until sufficient force is applied to temporarily deform the haptic feedback means, at which point the finger is close enough to register as a touch. Importantly, in accordance with the embodiments described herein, the haptic feedback means provides only mechanical resistance and can therefore be fabricated simply and inexpensively.

For example, in one embodiment, a mechanical haptic feedback means comprises a flexible plastic sheet with one or more convex bubbles, mechanically similar to dome-switch buttons. Unlike dome switches, however, there is no circuitry plated on the plastic, making it simpler and easier to produce and impervious to the metal fatigue issues to which dome switches are so susceptible. The plastic sheet is placed over a printed circuit board ("PCB") with touch areas located under each bubble. Also unlike dome-switch buttons, because nothing is plated on or attached to the plastic, the plastic may be selected entirely for its mechanical properties and cost. Bubbles can be designed with greater or lesser height to increase feedback or reduce profile, respectively. The switching threshold for the capacitive sense circuitry is adjusted to prevent inadvertent activation by a resting finger. In certain embodiments, especially those in which a user is in continual physical contact with the device in which the capacitive sensing mechanism is deployed, the switching thresholds associated with the feedback means may be user-adjustable.

FIG. 1 is a perspective view of a mechanical means for providing haptic feedback in connection with a capacitive sensing mechanism implemented as a combination navigation and activation device 100 in accordance with one embodiment. As shown in FIG. 1, the device 100 may be implemented in connection with a mobile phone device, such as the Blackberry® device, available from Research in Motion Ltd. As shown in FIG. 1, in accordance with one embodiment, a touchpad 102 comprises a navigation zone and is disposed on a top surface of a proximal end of a flexible PCB 104. A switch 106 is located directly below the touchpad on the underside of the PCB 104. The PCB 104 is cantilevered from an electrical/physical connector at a distal end thereof. Applying pressure to the touchpad 102 in a direction indicated by an arrow 108 forces the switch 106 toward a relatively immovable object, such as a plate 110, activating the switch 106 when the switch is moved to within a certain proximity to the plate. Prior art embodiments have been implemented using metal or plastic dome switches. As described above, plastic dome switches have short lifetimes due to metallization fatigue. Metal dome switches are difficult to mount, as they must be physically captured without constraining their deformability. One solution has been to fully constrain their perimeter (i.e. solder in place) and to fabricate a dimpler bump on the immovable object, although this may not be entirely satisfactory due to wearing of the bump and compromises required in the metal spring design.

In the embodiment illustrated in FIG. 1 and described herein, however, a spring mechanism 114 comprising a plastic dome is provided on the underside of the touchpad 100 between the switch 106 and plate 110. This arrangement functions as a mechanical haptic feedback means. Because the spring mechanism 114 does not form a direct part of the electrical switching circuit, the plastic dome comprising the mechanism can be designed and mounted in manner optimized for physical, rather than electrical, properties. For example, to require greater force to be applied before a touch is registered via the touch pad 102, the plastic dome comprising the spring mechanism 114 may be constructed having a greater height and of material having greater resilience than if less force is to be required.

Figure 2:
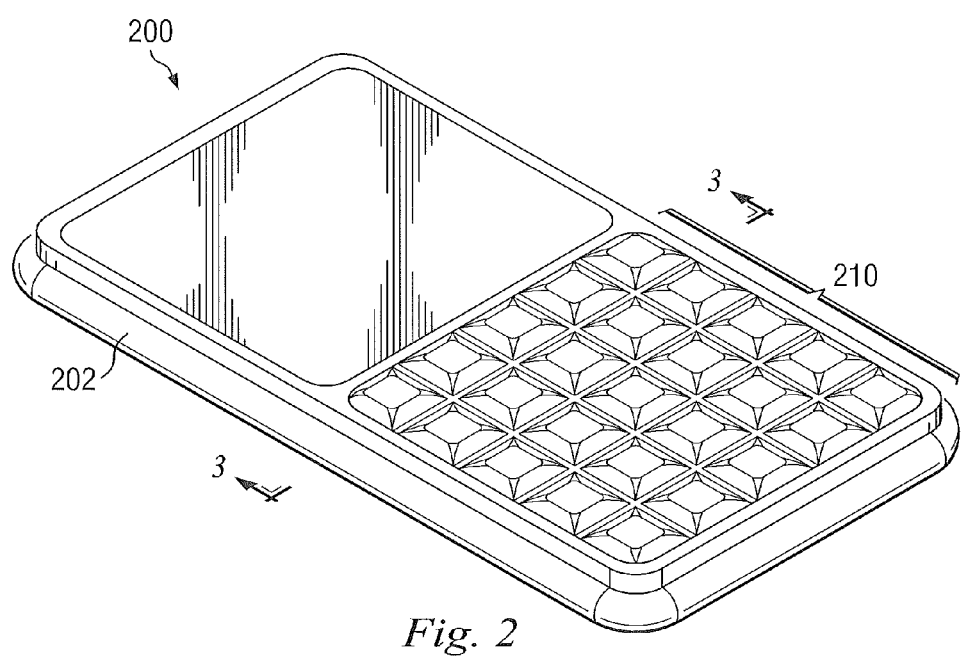
FIG. 2 is a perspective view of a handheld device in which a mechanical means for providing haptic feedback in connection with a capacitive sensing mechanism is implemented as a squeeze switch in accordance with one embodiment.
Figure 3:
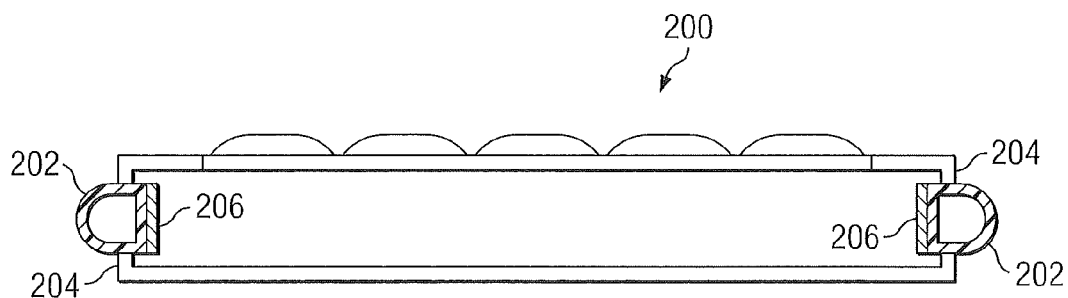
FIG. 3 is a cross-sectional view of the handheld device illustrated in FIG. 2 along a line 3-3.

FIGS. 2 and 3 illustrate implementation of certain embodiments of a mechanical haptic feedback means in connection with a squeeze switch for a handheld device 200. As best shown in FIG. 3, a plastic tube 202 is disposed along an outer perimeter of the device 200. The tube 202 may be hollow or filled with foam or other suitable sturdy but deformable material. The tube 202 may be disposed in a depression in the side walls 204 of the device 200 and may be retained therein by its own elasticity. Inside the device 200, the walls 204 are sufficiently conductive to serve as capacitive touch sensors. For example, the housing of the device 200 itself may be metalized or may have sensors 206 comprising metal strips or printed circuits attached to it. When the user picks up the device 200 without squeezing it, their hand is not close enough to the sensor(s) to register full (not proximity) touch. Squeezing brings some parts of the hand close enough to the sensors 206 to register as full touch. In areas where the tube 202 is hollow, snap action is provided.

In one embodiment, the squeeze switch shown in FIGS. 2 and 3 may be designed to detect different amounts of pressure, or squeeze force. For example, a user's merely picking up the device 200 without squeezing it could trigger lighting of its keyboard 210 only using proximity detection, while the user's squeezing the device would result in the device itself being fully activated. Additionally, push-button-like switching, squeeze switching, and/or proximity detection functionality may be combined in a single device 200 by simple changes in the fabrication, composition, and/or filling of tube 202 itself. For example, the tube 202 could be left hollow in areas along the perimeter of the device 200 where push-button-type functionality is desired, the hollow tube providing a snap action type of response to being pressed. In areas where squeeze-type switching is desired, the tube 202 may be filled with foam to damp snapping or may comprise a different, less reactive, material in those areas. Touch sensors, such as the sensors 206, disposed in the housing of the device may be specifically coordinated with action areas along the tube 202 or they may be generalized as a non-specific array of pads along the perimeter, enabling action to be redefined simply by changing the composition and/or filling of the tube 202.

Figure 4:
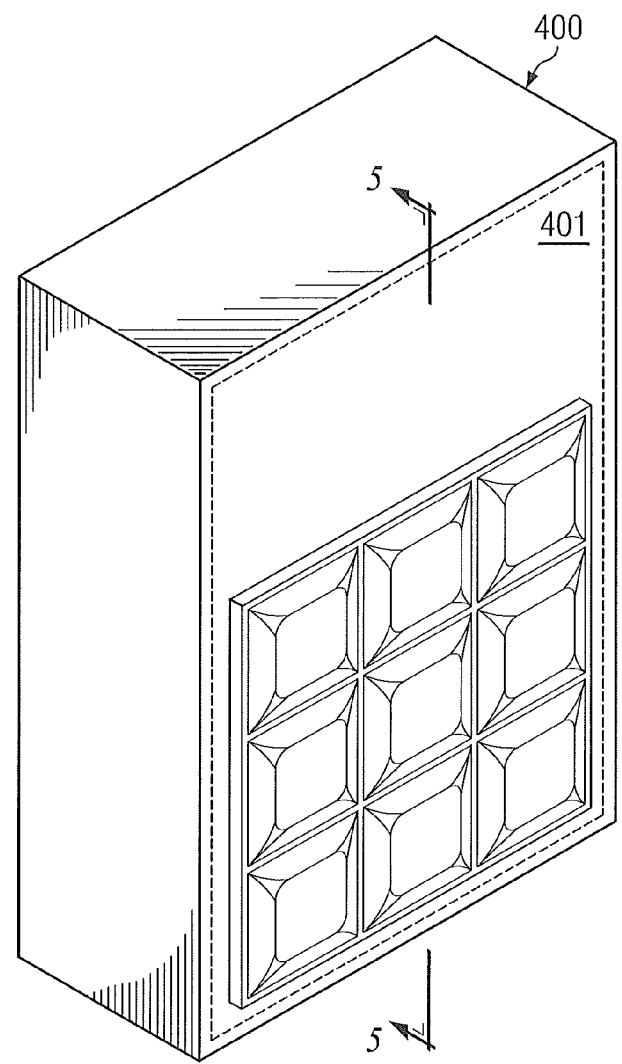
FIG. 4 is a perspective view of a generic electronic device in which a mechanical means for providing haptic feedback in connection with a capacitive sensing mechanism is implemented as a completely sealed switch matrix in accordance with one embodiment.
Figure 5:
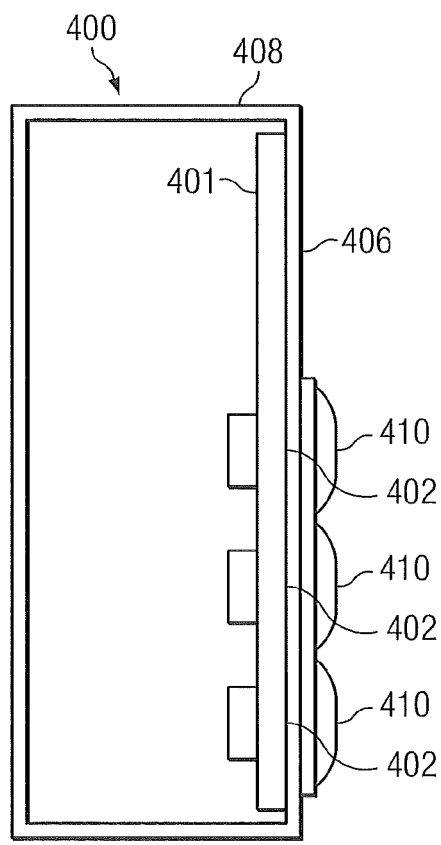
FIG. 5 is cross-sectional view of the generic electronic device illustrated in FIG. 4 along a line 5-5.
Figure 6:
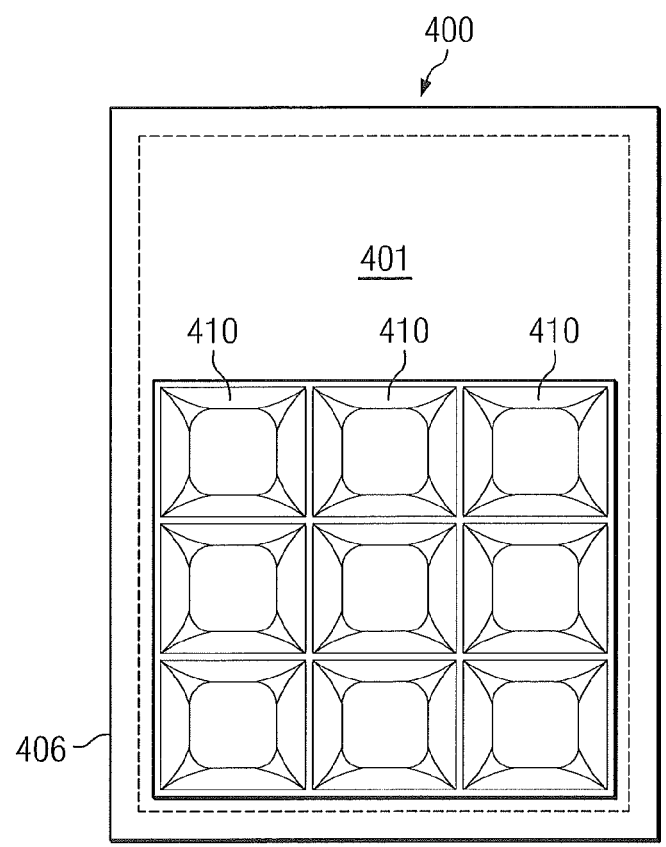
FIG. 6 is a plan view of a front face of the generic electronic device illustrated in FIG. 4.

FIGS. 4, 5, and 6 illustrate implementation of certain embodiments as a completely sealed capacitive switch matrix with tactile feedback in a generic electronic device 400. As best shown in FIGS. 5 and 6, a PCB 401 having capacitive sensor pads 402 disposed on one side and components 404 disposed on the other is disposed against an inside face of a first wall 406 of a non-conductive enclosure 408. The wall 406 may be fabricated such that plastic domes 410 overlie each of the pads 402, respectively, or a plastic overlay comprising the domes 410 may be attached to the wall 406. In either case, depressing one of the domes 410 provides haptic feedback to the user. Additionally, the structure of the dome 410 ensures that a requisite amount of pressure is applied to a dome and its corresponding sensor pad 402 such that a touch of the pad is not registered inadvertently.

It will be recognized that the examples provided above are exemplary only and are not intended to be limiting. One skilled in the art may readily devise other forms of mechanical means for providing haptic feedback in connection with capacitive sensing mechanisms consistent with embodiments of the present disclosure that are intended to be within the scope of this disclosure. As such, the application is limited only by the following claims. Moreover, it is understood that modifications, changes and substitutions are intended in the foregoing disclosure and in some instances some features of the embodiments will be employed without a corresponding use of other features. Accordingly, it is appropriate that the appended claims be construed broadly and in a manner consistent with the scope of the embodiments described herein.

Although the present disclosure has described embodiments relating to specific environments, it is understood that the apparatus, systems and methods described herein could applied to other environments. While the preceding description shows and describes one or more embodiments, it will be understood by those skilled in the art that various changes in form and detail may be made therein without departing from the spirit and scope of the present disclosure. For example, various functions illustrated in the methods or described elsewhere in the disclosure may be combined to provide additional and/or alternate functions. Therefore, the claims should be interpreted in a broad manner, consistent with the present disclosure.

What is claimed is:

1. Apparatus for providing haptic feedback in connection with a capacitive sensing mechanism, the apparatus comprising a convex, non-metallic structure arranged between components of the capacitive sensing mechanism so as to maintain a distance between an activation means and a component of the capacitive sensing mechanism until sufficient force is applied by the activation means, wherein the structure does not form a part of an electrical circuit comprising the capacitive sensing mechanism.

2. The apparatus of claim 1 wherein the structure is dome-shaped.

3. The apparatus of claim 1 wherein the structure comprises non-metalized plastic.

4. The apparatus of claim 1 wherein the structure comprises a tube.

5. The apparatus of claim 1 wherein the structure comprises a plastic tube having deformable material disposed therein.

6. The apparatus of claim 1 wherein the structure comprises a plastic sheet including a plurality of bubbles and wherein the plastic sheet is arranged such that each of the plastic bubbles overlies one of a plurality of touch areas of the capacitive sensing mechanism.

7. The apparatus of claim 1 wherein a switching threshold of the capacitive sensing mechanism is adjustable by a user.

8. Method for providing haptic feedback in connection with a capacitive sensing mechanism disposed in an electronic device, the method comprising arranging a non-metallic structure between components of the capacitive sensing mechanism in such manner as to maintain a distance between an activation means and a component of the capacitive sensing mechanism until sufficient force is applied with the activation means, wherein the structure does not form a part of an electrical circuit comprising the capacitive sensing mechanism.

9. The method of claim 8 wherein the structure is dome-shaped.

10. The method of claim 8 wherein the structure comprises non-metalized plastic.

11. The method of claim 8 wherein the structure comprises a tube.

12. The method of claim 8 wherein the structure comprises a tube having deformable material disposed therein.

13. The method of claim 8 wherein the structure comprises a plastic sheet including a plurality of bubbles and wherein the plastic sheet is arranged such that each of the plastic bubbles overlies one of a plurality of touch areas of the capacitive sensing mechanism.

14. An electronic device comprising a printed circuit board ("PCB") and an input device associated with the PCB, the input device including a capacitive sensing mechanism and a haptic feedback structure associated with the capacitive sensing mechanism, the haptic feedback structure providing a physical barrier between components of the capacitive sensing mechanism for preventing a touch to be detected by the capacitive sensing mechanism until sufficient force is applied with the activation means, wherein the structure does not form a part of an electrical circuit comprising the capacitive sensing mechanism.

15. The electronic device of claim 14 wherein the structure is dome-shaped.

16. The electronic device of claim 14 wherein the structure comprises non-metalized plastic.

17. The electronic device of claim 14 wherein the structure comprises a tube.

18. The electronic device of claim 14 wherein the structure comprises a plastic tube having deformable material disposed therein.

19. The electronic device of claim 14 wherein the structure comprises a plastic sheet including a plurality of bubbles and wherein the plastic sheet is arranged such that each of the plastic bubbles overlies one of a plurality of touch areas of the capacitive sensing mechanism.

20. The electronic device of claim 14 wherein the activation means comprises a finger or a stylus.

* * * * *